United States Patent
Takahashi et al.

(10) Patent No.: US 7,891,482 B2
(45) Date of Patent: Feb. 22, 2011

(54) WORK CARRIER APPARATUS IN ASSEMBLY LINE

(75) Inventors: Kaname Takahashi, Tokyo (JP); Yoshiharu Hatsusaka, Tokyo (JP); Mikiya Fukuda, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 287 days.

(21) Appl. No.: 12/083,972

(22) PCT Filed: Oct. 6, 2006

(86) PCT No.: PCT/JP2006/320053
§ 371 (c)(1),
(2), (4) Date: Jun. 24, 2008

(87) PCT Pub. No.: WO2007/049446
PCT Pub. Date: May 3, 2007

(65) Prior Publication Data
US 2009/0133989 A1   May 28, 2009

(30) Foreign Application Priority Data
Oct. 24, 2005   (JP) .............................. 2005-308340

(51) Int. Cl.
*B65G 17/10* (2006.01)
(52) U.S. Cl. ................. 198/822; 198/581; 198/831; 198/844.1
(58) Field of Classification Search ................. 198/581, 198/831, 822, 844.1
See application file for complete search history.

(56) References Cited

U.S. PATENT DOCUMENTS

| | | | | |
|---|---|---|---|---|
| 5,172,804 A | * | 12/1992 | Chersin | 198/861.5 |
| 5,394,978 A | * | 3/1995 | Majewski et al. | 198/833 |
| 6,488,145 B1 | * | 12/2002 | Diego et al. | 198/861.5 |
| 7,090,069 B2 | * | 8/2006 | Kawasaki | 198/494 |
| 7,168,556 B2 | * | 1/2007 | Spoeler | 198/831 |
| 7,588,140 B2 | * | 9/2009 | van den Goor et al. | 198/831 |

(Continued)

FOREIGN PATENT DOCUMENTS

CA   2 405 381 A1   4/2003

(Continued)

*Primary Examiner*—Douglas A Hess
(74) *Attorney, Agent, or Firm*—Birch, Stewart, Kolasch & Birch, LLP

(57) ABSTRACT

The object of the present invention is to improve the productivity and make the assembling operation easier in a carrier apparatus for carrying a work while performing an assembling operation by making effective use of an inside region, even in the case where a conveyor line is provided in the form of a circling route.

In a free flow type conveyor line (1) in which a work is loaded on a pallet (2) having a floor surface which travels substantially at the same level as a floor surface (5) for operation, a horizontal curved section (3) is provided in a section of the line (1), and the pallet (2) is divided into a first, a second and a third divided pallet elements (2A, 2B, 2C) in the carrying direction. The respectively divided pallet elements (2A, 2B, 2C) are mutually turnable in the horizontal plane by connecting the first divided pallet element (2A) to the second divided pallet elements (2B), and the second divided pallet element (2B) to the third divided pallet elements (2C), respectively through vertically extending pivot pins (9).

15 Claims, 4 Drawing Sheets

U.S. PATENT DOCUMENTS

2003/0079967 A1    5/2003    Nishihara

FOREIGN PATENT DOCUMENTS

| | | | |
|---|---|---|---|
| GB | 2 380 175 | A | 4/2003 |
| JP | 5-246538 | A | 9/1993 |
| JP | 2001-48006 | A | 2/2001 |
| JP | 2002-240707 | A | 8/2002 |
| JP | 2003-104197 | A | 4/2003 |
| JP | 2004-196114 | A | 7/2004 |

* cited by examiner

WORK CARRIER APPARATUS IN ASSEMBLY LINE

TECHNICAL FIELD

The present invention relates to a work carrier apparatus which is capable of improving workability, productivity and the like, for example, in an assembly line for assembling an engine for a vehicle.

BACKGROUND ART

Hitherto, there is known the art capable of improving workability when assembling an engine for a vehicle, for example, by having a floor surface of a carriage for loading and carrying an assembled engine formed at the same level as a floor surface of a passage for operations (for example, see patent reference 1).

There is also known the art where a secondary traveling line is connected to an upstream side and a downstream side of a primary straight traveling line to form a circulation line so as to have the carriage driven by friction drive means throughout the carrying route, wherein the assembling process is performed in such a manner that parts and the like are assembled into the carried article while the carriage is conveyed at a constant speed on the primary traveling line, and the carriage is conveyed at high speed on the secondary traveling line and returned to the original position thereof (for example, see patent reference 2).

Patent reference 1: Japanese patent application publication No. 2004-196114

Patent reference 2: Japanese patent application publication No. 2002-240707

DISCLOSURE OF THE INVENTION

Problem to be Solved by the Invention

In the art of patent reference 1, however, since the engine assembly line is formed in a straight fashion, a carriage turning section for changing the direction of the carriage must be provided in an upstream end and a downstream end of the line, respectively, and it is not possible to station an operator and the like for assembling work in these sections. Also, when changing at an acute angle the direction of the carriage 52 positioned at the same level as a floor surface 51, as seen in FIG. 7, a clearance "d" of larger area which is generally hollowed out of the floor surface 51 is required and the interruption of the traveling of the carriage 52 is required, whereby there is no room for the operator to conduct operations in the corner section.

Further, in the art of patent reference 2, when the primary traveling line and the secondary traveling line are provided substantially at the same level as the floor surface so as to form the circling route, parts and the like to be assembled are not able to be carried into the inside region of a conveyor line, so that the inside space of the conveyor line may not be effectively used and there is a disadvantage of causing a useless space.

Therefore, an object of the present invention is to facilitate the operations by employing a conveyor line such that a work is loaded on a pallet having a floor surface which is substantially at the same level as a floor surface for operations, and to make the workability better by dispensing with a carriage turning section in the corner section and the like, while improving the productively by making effective use of the inside space of the conveyor line even in the case where the conveyor line is provided in the form of the circling route.

MEANS FOR SOLVING THE PROBLEM

To achieve the above mentioned object, in accordance with the present invention, a work carrier apparatus in an assembly line in which a work loaded on each of pallets is carried successively along a conveyor line, comprising a horizontal curve section which curves in a horizontal plane, being provided in at least a section of the conveyor line, and a floor surface of the pallet being adapted to travel substantially at the same level as a floor surface for operations, wherein each of the pallets is divided into a plurality of elements in the carrying direction, and the divided pallet elements are turnably connected to one another in a horizontal plane.

When the horizontal curve section of the assembly line which curves in the horizontal plane is provided in at least a section of the conveyor line, and a curvature of this horizontal curve section is formed in a predetermined curve, the conveyor line in which the pallets are capable of being carried successively can be formed. Then, if each of the pallets is divided into a plurality of elements in the carrying direction, and the divided pallet elements are turnably connected to one another in a horizontal plane, an overhanging amount in a lateral direction of the pallet may be decreased when the pallet travels along the curve of the horizontal curve section and a clearance created relative to the floor surface may be diminished. Therefore, the operator can conduct operations in such locations thereby improving the workability.

Also, in the present invention, a pallet carrying method is formed in such a free flow method that, when a succeeding pallet runs into a forwardly traveling pallet, the succeeding pallet pushes the forwardly traveling pallet, wherein a space setting means for widening and narrowing the space between the pallets is removably provided in a forward section or a backward section of the pallet in the traveling direction thereof.

Similarly, since the pallet carrying method is formed in a free flow method, the flexibility for moving and stopping the work is increased when the parts are assembled into the carried work, thereby making it possible to improve both the carrying performance and the workability. Also, since the space setting means is removably provided relative to the pallet, the space setting means can be mounted on the pallet to extend tact time or to widen space between the works so as to create sufficient working space, for example, in the case where the operator is poor in proficiency and requires more time for assembling work. Alternatively, the space setting means can be removed to shorten the tact time or the like, for example, in the case where the proficiency is improved and the shortening of the tact time is required. Accordingly, it is not necessary to provide a speed adjusting mechanism or the like in the conveyor. Moreover, other than in the case of being mounted or removed according to a skill level or in on-the-job-training or the like, the space setting means performs effectively in the case of adjusting the number of works in production or in the case of preventing interference between the works where a kind of the work to be carried is changed.

Further, in the present invention, the conveyor line is provided in the form of an endless circling route, wherein a bridge section for opening a passage for going in and out when a person, parts and the like are let in to an inside region of the conveyor line is locally provided in at least one section of the conveyor line.

Like this, if the bridge section is used in such a manner that an operator passes through or the parts to be assembled are delivered through the bridge section to the inside region, it is possible to make effective use of space and to heighten working efficiency. Then, the bridge section of the conveyor line is provided at a higher position or a lower position than a floor surface, and, when necessary, in the vicinity of the bridge section there is provided an elevator mechanism for having the pallet at the level of the floor surface carried up or down to the bridge section and for having the pallet on the bridge section carried up or down to the level of the floor surface.

EFFECTS OF THE INVENTION

In the case where the work is loaded on the pallet having a floor surface which travels substantially at the same level as the floor surface for operations, so as to assemble the parts or the like into the work, the horizontal curve section which curves in a horizontal plane, is provided in at least a section of the conveyor line, and each of the pallets is divided into a plurality of elements in a carrying direction, wherein the divided pallet elements are turnably connected to one another in a horizontal plane. With this construction, the pallets can be successively carried even in the curved corner of the horizontal curve section, and operations can be performed there. Therefore, both the workability and productivity can be improved. Then, when the space setting means is removably mounted on the pallets, it is possible to adjust the tact time. Further, when the bridge section is provided in a section of the conveyor line, it is possible to make effective use of the inside region of the line.

BEST MODE FOR CARRYING OUT THE INVENTION

Figure 1:
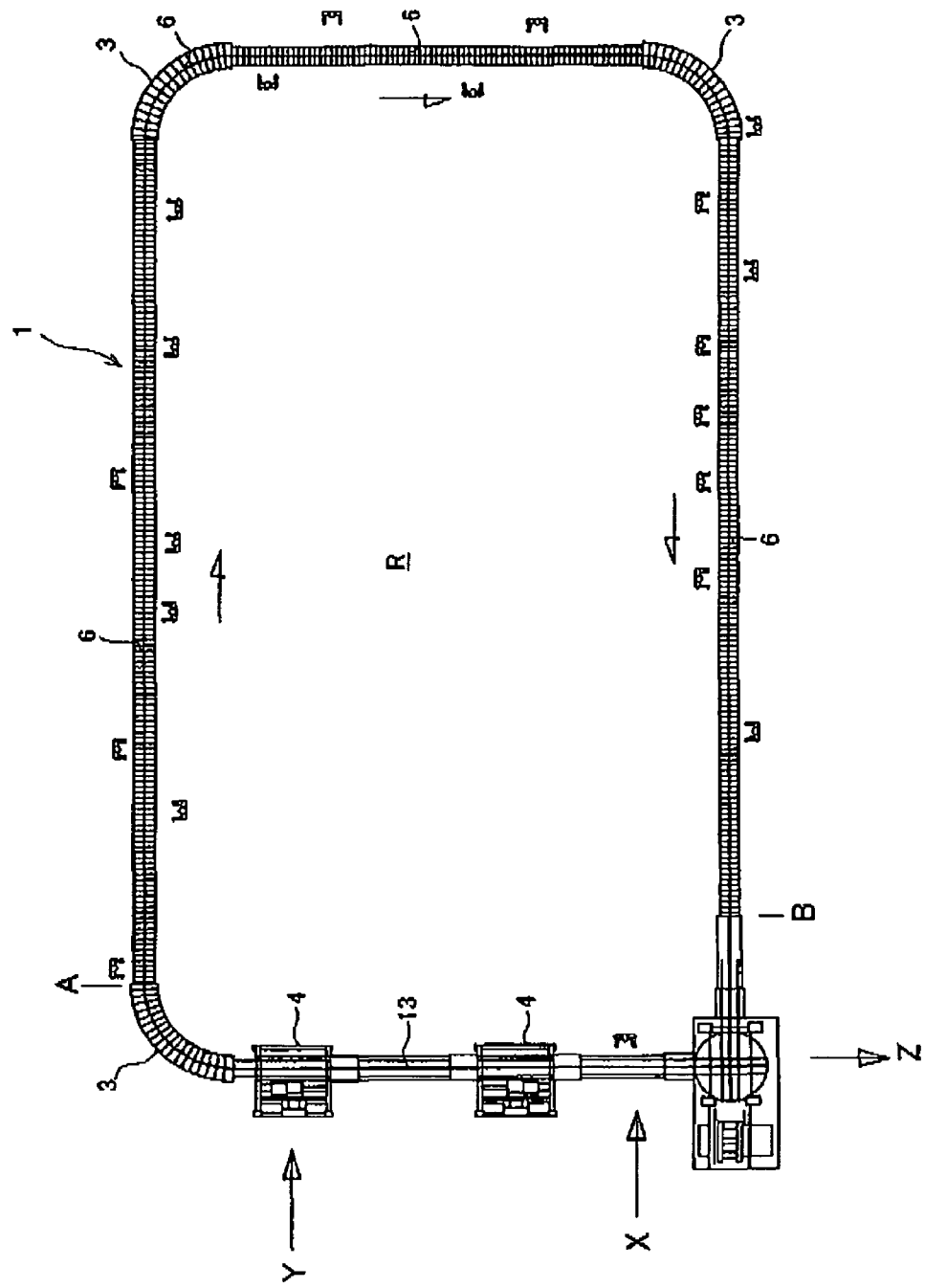
FIG. 1 is a view showing an embodiment of an entire construction of a work carrier apparatus according to the present invention.
Figure 2:
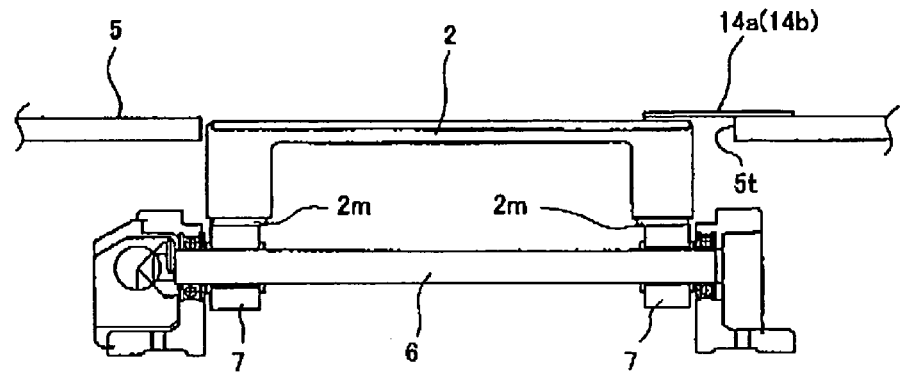
FIG. 2 is an explanatory view of an embodiment of a conveyor.
Figure 3:
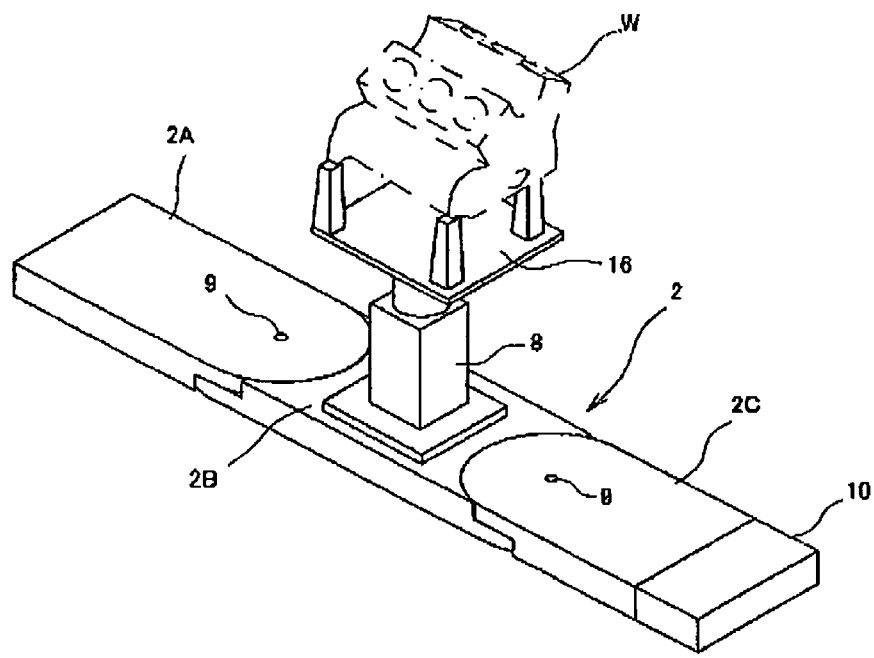
FIG. 3 is a view showing an embodiment of a pallet.
Figure 4:
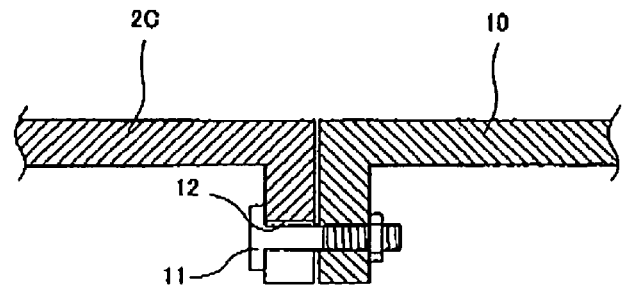
FIG. 4 is a view showing an example of a connecting method between a space setting means and the pallet.
Figure 5:
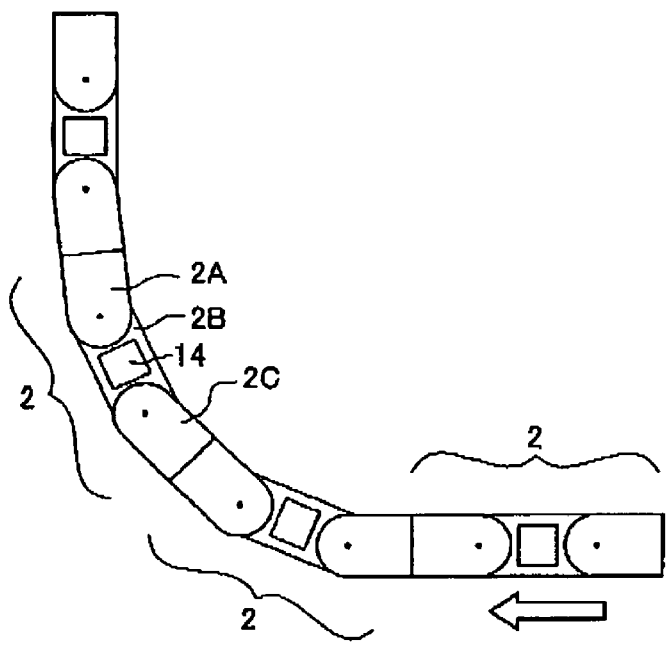
FIG. 5 is an explanatory view of a traveling condition of the pallet in a horizontal curve section.
Figure 6:
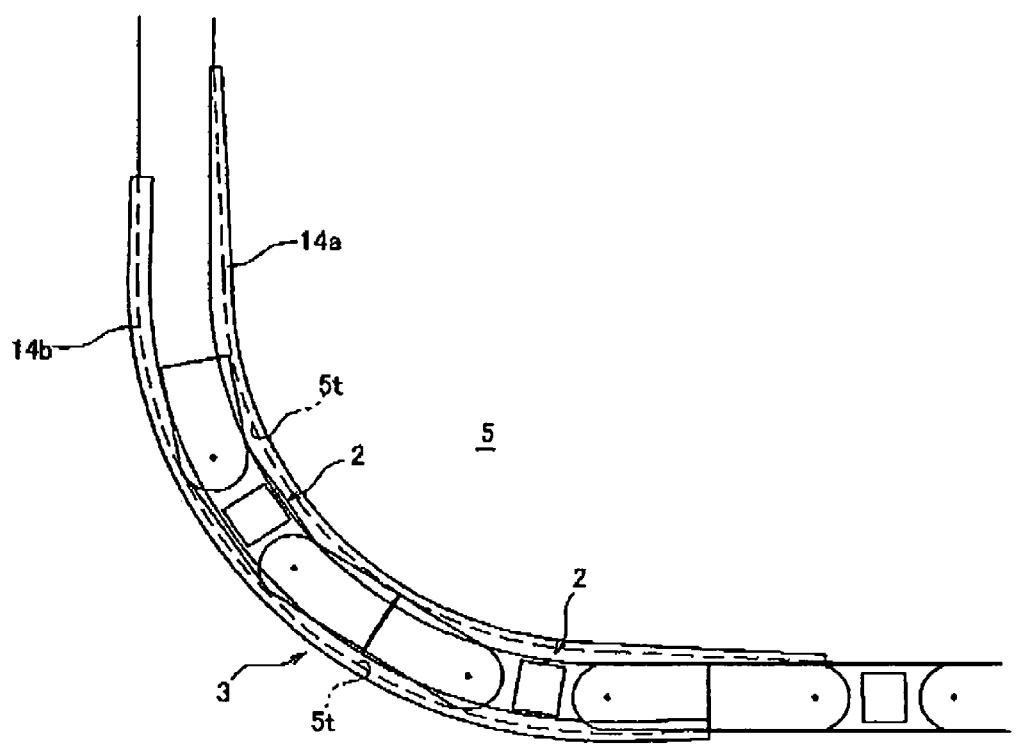
FIG. 6 is an explanatory view of a cover arranged for covering a clearance created relative to a floor surface on an inward side and an outward side of a curve corner of the horizontal curve section.
Figure 7:
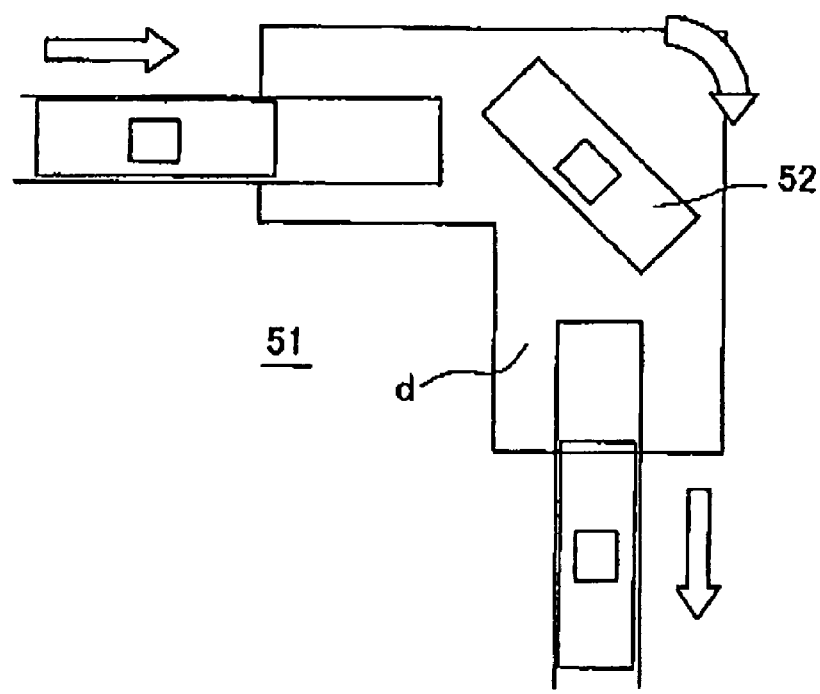
FIG. 7 is an explanatory view in the case of providing a direction turning section of a carriage.

An embodiment of the present invention will be described with reference to the accompanying drawings. Herein, FIG. 1 is a view showing an embodiment of an entire construction of a work carrier apparatus according to the present invention. FIG. 2 is an explanatory view of an embodiment of a conveyor. FIG. 3 is a view showing an embodiment of a pallet. FIG. 4 is a view showing an example of a connecting method between a space setting means and the pallet. FIG. 5 is an explanatory view of a traveling condition of the pallet in a horizontal curve section. FIG. 6 is an explanatory view of a cover arranged for covering a clearance created relative to a floor surface on an inward side and an outward side of a curve corner of the horizontal curve section.

The work carrier apparatus in an assembly line according to the present invention is applicable, for example, to a line for assembling an engine for a vehicle, and is designed to facilitate operations by employing such a conveyor line that a work is loaded on a pallet having a floor surface which is substantially at the same level as a floor surface for operations, and to make the workability better by dispensing with a carriage turning section in a corner section or the like while improving the productively by making effective use of an inside space of the conveyor line even in the case where the conveyor line is provided in the form of a circling route.

As seen in FIG. 1, a free flow type conveyor line 1 is provided in the form of a circling route in this engine assembling process. When a cylinder block is loaded from a cylinder block loading section X onto a pallet 2 as referred to hereinafter, the pallet 2 travels upwardly in the drawing. When it reaches a cylinder head loading section Y, a cylinder head is loaded onto the pallet 2 from the cylinder head loading section Y so as to be united with the cylinder block. Thereafter, relative component parts are assembled into the work during a period within which the pallet makes substantially a round in a clockwise direction along the conveyor line 1 from an A position to a B position in the drawing. Then, the work W is unloaded from an unloading section Z in the drawing.

In the conveyor line 1 between the cylinder block loading section X and the cylinder head loading section Y, there is locally arranged a bridge section 13 provided in a higher position than the floor surface, under which an entrance and exit passage is formed to use as a passage at the time when a person, the parts and others go into an inside region R of the conveyor line 1. At corner sections of the conveyor line 1 are provided horizontal curve sections 3. Then, the pallet 2 is able to run at low speed in the free flow method between the A position and the B position in the drawing. After that, until the pallet returns from the B position via the bridge section 13 to the A position, the pallet 2 is able to be delivered one by one at high speed. Moreover, in front of and behind the bridge section 13, there is provided a pair of elevator mechanisms 4 for having the pallet 2 carried up and down so that the pallet 2 can be carried up and down one by one by an elevator or the like. The cylinder head loading section Y is connected to one of the elevator mechanisms 4.

As seen in FIG. 2, in the conveyor line 1 and the horizontal curve sections 3 between the A position and the B position, a plurality of roller shafts 6 are arranged at a lower level than a floor surface 5 at predetermined intervals to extend at right angles relative to the direction of the carrying route. A pair of rollers 7 is mounted on each of the roller shafts 6. Each of the roller shafts 6 is provided turnable around the axis thereof, for example, through a chain drive device, a gear drive device or the like. The pallet 2 is placed on the upper portions of the rollers 7 in such a manner that the pallet 2 travels by the friction between the rollers 7 and friction walls 2m fixedly secured to lower surfaces of the pallet 2. Further, when the pallet 2 is placed on the rollers 7, the upper surface of the pallet 2 is positioned substantially at the same level as the floor surface 5. The roller shafts 6 as above are arranged a lot at the predetermined intervals not only in a straight section but also in the horizontal curve sections 3 of the conveyor line 1.

The pallet 2, as seen in FIG. 3, is formed such that the longitudinal direction thereof corresponds to the carrying direction, and is divided into a first, a second and a third divided pallet elements 2A, 2B, 2C in the longitudinal direction (carrying direction). A work support stand 8 for holding the work W is provided on an upper central portion of the second divided pallet element 2B in such a manner that a work support plate 16 for supporting the work W is able to be changed in direction through the operation of a lock cancellation lever (not shown) and to be moved up and down through the operation of a pedal (not shown). The first and the second divided pallet elements 2A, 2B are turnably connected to one another by a vertically extending pivot pin 9 while the second and the third divided pallet elements 2B, 2C are turnably connected to one another by another vertically extending pivot pin 9. Like this, the first, the second and the third divided pallet elements 2A, 2B, 2C are arranged turnable in a horizontal plane around the pivot pin 9 with respect to one another.

Further, in this embodiment, a space setting means 10 is removably connected to an end of the third divided pallet element 2C. The height and width of this space setting means 10 are identical with the height and width of the pallet 2. In order to perform the connection and removal of the space setting means 10 in a simple operation, for example, as seen in FIG. 4, an engaging projection member 11 is fixedly secured to an end of the space setting means 10 in advance and is engaged with an engaging groove 12 provided on the third divided pallet element 2C, whereby the connection and separation of the space setting means can be performed in a one-touch operation.

This space setting means 10 is adapted to be connected or separated, for example, at the time of adjusting the tact time according to the skill level of the operator or at the time of making the operations easier by widening the space between the works.

The pallets 2 as above are put onto the conveyor line 1 one after another, and the operators assemble the parts or the like into the work W while the pallets 2 are carried to the downstream side at low speed by the friction between the roller 7 and the friction wall 2m through the rotation of the roller shaft 6. This operation may also be performed in the state where the pallet 2 has stopped traveling temporarily depending upon the progress of the operations. At that time, such flexible measures that the pallet 2 behind is stopped traveling together with the pallet 2 in front, for example, may be taken according to the operations.

When the pallet 2 reaches the horizontal curve section 3, as seen in FIG. 5, the respective divided pallet elements 2A, 2B, 2C travel while each rotating independently along a curved line of the curve so that they are capable of turning with a short turning radius. Then, since an overhanging amount in the lateral direction of the pallet 2 is small, a clearance created between the floor surface 5 and the pallet 2 can be made small.

Incidentally, in this embodiment, covers 14a, 14b are provided on the floor surfaces which correspond to the horizontal curve sections 3, so as to cover the clearance created on the inward side of the curve and the clearance created on the outward side of the curve. Next, such covers will be explained with reference to FIG. 6.

Since the pallet 2 of the present invention is divided into a plurality of the divided pallet elements 2A, 2B, 2C relative to the carrying direction thereof, it is possible to lessen the clearance created between the pallet 2 and each end St of the floor surface 5 corresponding to the horizontal curve section 3. However, a certain clearance is present.

Therefore, in this embodiment, the inward cover 14a is mounted on the floor surface 5 situated on the inside of the curve while the outward cover 14b is provided on the floor surface 5 situated on the outside of the curve, so as to cover the clearance. Herein, the covers 14a, 14b as above are fixed on the floor surface 5 in such a manner as seen on the right side in FIG. 2, for example. In this embodiment, since the covers 14a, 14b project upwardly by the thickness thereof from the floor surface 5, there are used the covers 14a, 14b formed as thin as possible.

Next, the operation and the like with respect to the entire construction of the carrier apparatus as above will be explained.

When the cylinder block is taken in from the cylinder block loading section X, it is loaded on the work supporting plate 16 of the pallet 2. This pallet 2 is carried toward the downstream side, and is elevated to the bridge section 13 through the elevator mechanism 4 situated on the upstream side of the bridge section. After traveling along the bridge section 13, the pallet 2 is let down from the bridge section through the elevator mechanism 4 situated on the downstream side thereof. In this position, the cylinder head which is taken in through the cylinder head loading section Y is mounted on and united with the cylinder block on the work supporting plate 16.

Then, after the pallet 2 is delivered to the A position of the conveyor line 1, it is carried toward the downstream side at low speed by the free flow method while the parts and the like are assembled into the work by the operators. When the pallet 2 after passing through the straight section of the conveyor line 1 reaches the horizontal curve section 3, each of the divided pallet elements 2A, 2B, 2C turns independently and travels at the predetermined speed. Therefore, the operator may continue the operations depending on the situation, and moreover there is no problem that the operations become difficult due to the clearance created around the floor surface 5.

At the time when the pallet is carried to the B position, the assembling operations of the parts are completed and the work W is taken out of the unloading section Z. The pallet 2 which has become empty is carried to the downstream side at high speed, and the cylinder block is loaded again at the cylinder block loading section X, so that the same process is repeated.

Then, the operator, the parts and the like are able to be let in through the passage under the bridge section 13 to the inside region of the conveyor line 1, whereby it is possible to make effective use of the space and to conduct the efficient operations.

Further, in the case of performing the training of the operators or in the case where the model of the work W to be assembled is changed, the space setting means 10 is fitted on the front portion or the rear portion in the traveling direction of the pallet 2, depending on the situation, whereby the tact time can be easily changed.

While the invention has been described in its preferred form, it is to be understood that the present invention is not limited to the above described embodiment. Those which have substantially the same construction as that defined in the claims and perform substantially the same effects will fall within the technical scope of the present invention. For example, the carrying mechanism of the pallet 2 on the conveyor line 1 and the kind of the work are shown by way of example.

INDUSTRIAL APPLICABILITY

Even in the case where the conveyor line is provided in the form of the circling route and in which the pallet is positioned at substantially the same level as the floor surface, it is possible to let people, parts or the like into the inside region thereof. Furthermore, it is possible to improve operation efficiency and productivity by dividing the pallet into plural elements with respect to the carrying direction thereof. Therefore, it is properly applicable as the carrier apparatus for an engine assembly line or the like.

The invention claimed is:

1. A work carrier apparatus on an assembly line in which a work loaded on each of pallets is carried successively along a conveyor line, comprising:
   a horizontal curve section which curves in a horizontal plane, being provided in at least a section of the conveyor line,
   a floor surface of the pallet being adapted to travel substantially at the same level as a floor surface for operations,
   wherein each of the pallets is divided into plural elements with respect to a carrying direction, and the divided pallet elements are turnably connected to one another in a horizontal plane by a vertically extending pivot pin while a circular arc shaped convex portion of one divided pallet element is engaged with a circular arc shaped concave portion of another divided pallet element to leave no space between the respective divided pallet elements, and
   a work support stand for holding the work is provided on an upper central portion of a second divided pallet element, and a first and the second divided pallet elements and the second and a third divided pallet elements are turnably connected to one another.

2. The work carrier apparatus in an assembly line according to claim 1, wherein a pallet carrying method is formed in such a free flow method that, when a succeeding pallet runs into a forwardly traveling pallet, the succeeding pallet pushes the forwardly traveling pallet, and a space setting means for widening and narrowing space between the pallets is removably provided in a forward section or a backward section of the pallet in the traveling direction thereof.

3. The work carrier apparatus according to claim 2, wherein the conveyor line is provided in the form of an endless circling route, and a bridge section for opening a passage for going in and out an inside region of the conveyor line is locally provided in at least a section of the conveyor line.

4. The work carrier apparatus according to claim 1, wherein the conveyor line is provided in the form of an endless circling route, and a bridge section for opening a passage for going in and out an inside region of the conveyor line is locally provided in at least a section of the conveyor line.

5. The work carrier apparatus according to claim 1, and further including a space setter removably connected to an end of one divided pallet element by an engaging projection member.

6. The work carrier apparatus according to claim 5, wherein a height of the space setter is identical to a height of the pallet, and a width of the space setter is identical to a width of the pallet.

7. The work carrier apparatus according to claim 1, and further including a cover mounted on the floor surface correspond to the horizontal curve section situated on one side of the horizontal curve section.

8. A work carrier apparatus on an assembly line in which a work loaded on each of pallets is carried successively along a conveyor line, comprising:
   a horizontal curve section which curves in a horizontal plane, being provided in at least a section of the conveyor line, and
   a floor surface of the pallet being adapted to travel substantially at the same level as a floor surface for operations,
   wherein each of the pallets is divided into plural elements with respect to a carrying direction, and the divided pallet elements are turnably connected to one another in a horizontal plane by a vertically extending pivot pin while a circular arc shaped convex portion of one divided pallet element is engaged with a circular arc shaped concave portion of an adjacent divided pallet element to leave no space between the respective divided pallet elements,
   wherein the circular arc shaped convex portion of one divided pallet element overlaps the circular arc shaped concave portion of the adjacent divided pallet.

9. The work carrier apparatus according to claim 8, and further including a space setter removably connected to an end of one divided pallet element by an engaging projection member.

10. The work carrier apparatus according to claim 9, wherein a height of the space setter is identical to a height of the pallet, and a width of the space setter is identical to a width of the pallet.

11. The work carrier apparatus according to claim 8, and further including a cover mounted on the floor surface correspond to the horizontal curve section situated on one side of the horizontal curve section.

12. A work carrier apparatus on an assembly line in which a work loaded on each of pallets is carried successively along a conveyor line, comprising:
   a horizontal curve section which curves in a horizontal plane, being provided in at least a section of the conveyor line, and
   a floor surface of the pallet being adapted to travel substantially at the same level as a floor surface for operations,
   wherein each of the pallets is divided into plural elements with respect to a carrying direction, and the divided pallet elements are turnably connected to one another in a horizontal plane by a vertically extending pivot pin while a circular arc shaped convex portion of one divided pallet element is engaged with a circular arc shaped concave portion of an adjacent divided pallet element to leave no space between the respective divided pallet elements,
   wherein pallets run at an uneven speed depending on predetermined straight portions of the assembly line on which the pallets are conveyed.

13. The work carrier apparatus according to claim 12, and further including a space setter removably connected to an end of one divided pallet element by an engaging projection member.

14. The work carrier apparatus according to claim 13, wherein a height of the space setter is identical to a height of the pallet, and a width of the space setter is identical to a width of the pallet.

15. The work carrier apparatus according to claim 12, and further including a cover mounted on the floor surface correspond to the horizontal curve section situated on one side of the horizontal curve section.

* * * * *